United States Patent
Bai et al.

(10) Patent No.: US 12,032,782 B2
(45) Date of Patent: Jul. 9, 2024

(54) ANTI-INTERFERENCE METHOD AND APPARATUS FOR TOUCH SIGNAL

(71) Applicant: Wuhan China Star Optoelectronics Technology Co., Ltd., Hubei (CN)

(72) Inventors: Yibo Bai, Hubei (CN); Jun Li, Hubei (CN); Peng Tu, Hubei (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 17/435,144

(22) PCT Filed: Jul. 26, 2021

(86) PCT No.: PCT/CN2021/108382
§ 371 (c)(1),
(2) Date: Aug. 31, 2021

(87) PCT Pub. No.: WO2023/272832
PCT Pub. Date: Jan. 5, 2023

(65) Prior Publication Data
US 2024/0012514 A1   Jan. 11, 2024

(30) Foreign Application Priority Data
Jun. 30, 2021 (CN) .......... 202110733580.5

(51) Int. Cl.
*G06F 3/041* (2006.01)
*G06F 3/044* (2006.01)

(52) U.S. Cl.
CPC ........ *G06F 3/0418* (2013.01); *G06F 3/04166* (2019.05); *G06F 3/044* (2013.01)

(58) Field of Classification Search
CPC .... G06F 3/0418; G06F 3/04166; G06F 3/044; G06F 3/045; G06F 3/041; H04L 27/22
See application file for complete search history.

(56) References Cited

U.S. PATENT DOCUMENTS

| 2013/0222322 | A1  | 8/2013  | Drew |
| 2015/0346864 | A1* | 12/2015 | Yang ................... G06F 3/04186 345/174 |
| 2018/0046323 | A1* | 2/2018  | Yang ..................... G06F 3/0418 |
| 2019/0377468 | A1* | 12/2019 | Micci ....................... G01L 1/16 |
| 2022/0221973 | A1* | 7/2022  | Kierys ................ G06F 3/04166 |

FOREIGN PATENT DOCUMENTS

| CN | 103353816 | 10/2013 |
| CN | 103970315 | 8/2014  |
| CN | 104765483 | 7/2015  |
| CN | 110597414 | 12/2019 |

OTHER PUBLICATIONS

International Search Report and the Written Opinion dated Mar. 28, 2022 From the International Searching Authority Re. Application No. PCT/CN2021/108382 and Its Translation Into English. (15 Pages).

\* cited by examiner

*Primary Examiner* — Michael A Faragalla

(57) ABSTRACT

The embodiment of the present disclosure provides an anti-interference method and apparatus for touch signal. When scanning the touch signal, increasing the scanning frequency of the touch drive circuit to obtain more touch signal data corresponding to interference, and then comparing and removing the abnormal touch signal data, and outputting the finally sifted touch signal data to achieve the purpose of improving the touch effect of the touch screen and the accuracy of the touch screen reported point.

14 Claims, 3 Drawing Sheets

ANTI-INTERFERENCE METHOD AND APPARATUS FOR TOUCH SIGNAL

RELATED APPLICATIONS

This application is a National Phase of PCT Patent Application No. PCT/CN2021/108382 having International filing date of Jul. 26, 2021, which claims the benefit of priority of Chinese Patent Application No. 202110733580.5 filed on Jun. 30, 2021. The contents of the above applications are all incorporated by reference as if fully set forth herein in their entirety.

FIELD AND BACKGROUND OF THE INVENTION

The present disclosure relates to touch signal technology, and more particularly to an anti-interference method for touch signal and apparatus.

With the continuous improvement of display panel manufacturing technology, users have gradually increased the performance requirements of touch screens.

Nowadays, touch screens have been applied to many display devices. Because the touch screen has the advantages of high efficiency, fast and convenient operation, it is accepted by users. At present, touch screens can be divided into plug-in touch screens, surface-covered touch screens, and embedded touch screens according to their composition structure. Among the above-mentioned different types of touch screens, embedded touch screens are widely used due to their advantages of low cost and fewer processes, especially in in-vehicle display products. As the in-vehicle display products are in use, the entire vehicle is highly electrified, and there are more and more electronic devices and cables in the in-vehicle display products. These electronic devices and cables will continuously emit radiated electric field and electromagnetic interference during operation. Therefore, the electromagnetic and radiation environment of the in-vehicle embedded touch screen is more complicated. When the in-vehicle touch products are touched and output touch commands, during the touch driving circuit recognizes and outputs these touch commands, these touch commands are more likely to be interfered by the external environment, which makes the touch control fail or makes the touch panel receive wrong reported point data when the screen is touched. As a result, the performance of the touch screen is affected.

In summary, when performing touch control and detection on in-vehicle touch display products, the touch signal of the touch screen is easily interfered by the external environment, which in turn affects the accuracy of the reported point data of the touch screen and the performance of the touch product.

SUMMARY OF THE INVENTION

To address the aforementioned problem, the embodiment of the present disclosure provides an anti-interference method for touch signal and an anti-interference apparatus to solve the issue that touch signal data is inaccurate and the reported point data of the touch screen is wrong when the existing in-vehicle display products are interfered by external systems. Accordingly, the touch effect of the touch panel is improved.

To solve the aforementioned technical problem, the technical method provided by the embodiment of the present disclosure are as follows:

One objective of an embodiment of the present disclosure provides an anti-interference method for touch signal, which includes following steps: receiving a user touch command of a touch panel, fetching touch signal data output from the user touch command and storing the touch signal data to a cache module, fetching a capacitance value of a touch control circuit corresponding to when the touch panel receives the user touch command, determining whether the capacitance value is greater than a predetermined capacitance value, if the capacitance value is greater than the predetermined capacitance value, increasing scanning frequency of the touch control circuit, and reading touch signal data from the cache module, and comparing and sifting the touch signal data, when comparing the touch signal data, counting and classifying all of the touch signal data to obtain a set of touch signal data, determining location areas corresponding to each of the touch signal data according to the set, finding a dense area of the touch signal data from the location areas, defining the touch signal data in the dense area as normal data, and outputting the touch signal data.

According to one embodiment of the present disclosure, when the touch panel reads the touch signal data from the cache module, the anti-interference method for touch signal further includes: dividing every scan time period of predetermined length interval into a storage period, reading the touch signal data corresponding to a first storage period from the cache module when the capacitance value is less than or equal to the predetermined capacitance value, and reading the touch signal data corresponding to a second storage period from the cache module when the capacitance value is greater than the predetermined capacitance value. The length of the touch signal data corresponding to the second storage period is longer than the length of the touch signal data corresponding to the first storage period.

According to one embodiment of the present disclosure, when the capacitance value is less than or equal to the predetermined capacitance value, reading the touch signal data from the cache module directly, and outputting the touch signal data.

According to one embodiment of the present disclosure, the length of the second storage period includes at least two frames of touch signal data corresponding to the non-interference condition.

According to one embodiment of the present disclosure, when the touch panel receives the user touch command, the user touch command includes touch button command and sliding touch command.

According to one embodiment of the present disclosure, when sifting the touch signal data, the anti-interference method for touch signal further including: fetching a plurality of frames of the touch signal data output from the touch panel, and comparing different touch signal data, sifting and removing the touch signal data corresponding to interference, and removing the touch signal data.

According to one embodiment of the present disclosure, when comparing the touch signal data, removing the touch signal data corresponding to the capacitance value greater than the predetermined capacitance value.

According to one embodiment of the present disclosure, the touch signal data includes coordinate information, touch area information, and touch pressure information of touch-point corresponding to the user touch command.

One objective of another embodiment of the present disclosure provides an anti-interference method for touch signal. The anti-interference method for touch signal including receiving a user touch command of a touch panel, fetching touch signal data output from the user touch command and storing the touch signal data to a cache module, fetching a capacitance value of a touch control circuit corresponding to when the touch panel receives the user touch command, determining whether the capacitance value is greater than a predetermined capacitance value, if the capacitance value is greater than the predetermined capacitance value, increasing scanning frequency of the touch control circuit, and reading touch signal data from the cache module, and comparing and sifting the touch signal data, and outputting the touch signal data.

According to one embodiment of the present disclosure, when the touch panel reads the touch signal data from the cache module, the anti-interference method for touch signal further including dividing every scan time period of predetermined length interval into a storage period, reading the touch signal data corresponding to a first storage period from the cache module when the capacitance value is less than or equal to the predetermined capacitance value, and reading the touch signal data corresponding to a second storage period from the cache module when the capacitance value is greater than the predetermined capacitance value. The length of the touch signal data corresponding to the second storage period is longer than the length of the touch signal data corresponding to the first storage period.

According to one embodiment of the present disclosure, when the capacitance value is less than or equal to the predetermined capacitance value, reading the touch signal data from the cache module directly, and outputting the touch signal data.

According to one embodiment of the present disclosure, the length of the second storage period includes at least two frames of touch signal data corresponding to the non-interference condition.

According to one embodiment of the present disclosure, when the touch panel receives the user touch command, the user touch command includes touch button command and sliding touch command.

According to one embodiment of the present disclosure, when sifting the touch signal data, the anti-interference method for touch signal further including: fetching a plurality of frames of the touch signal data output from the touch panel, comparing different touch signal data, sifting and removing the touch signal data corresponding to interference, and removing the touch signal data.

According to one embodiment of the present disclosure, when comparing the touch signal data, removing the touch signal data corresponding to the capacitance value greater than the predetermined capacitance value.

According to one embodiment of the present disclosure, the touch signal data includes coordinate information, touch area information, and touch pressure information of touch-point corresponding to the user touch command.

According to the third aspect aspect of the embodiment of the present invention, an anti-interference apparatus for touch signal is provided. The anti-interference apparatus includes a touch module configured to receive a user touch command, a fetching module configured to fetch touch signal data output from the user touch command, a cache module configured to store the touch signal data, and an output module configured to output the touch signal data.

When the anti-interference apparatus for touch signal is under interference, processing the touch signal data with the anti-interference method according to the embodiment of the present disclosure.

According to one embodiment of the present disclosure, the anti-interference apparatus for touch signal further includes a judgment module configured to compare the touch signal data fetched from the fetching module.

According to one embodiment of the present disclosure, when the judgment module is comparing the touch signal data, comparing the difference between a capacitance value corresponding to the touch signal data and a predetermined capacitance value.

According to one embodiment of the present disclosure, when the capacitance value corresponding to the touch signal data is less than or equal to the predetermined capacitance value, reading the touch signal data from the cache module directly.

In summary, the beneficial effects of the present disclosure are as follows:

The embodiment of the present disclosure provides an anti-interference method and apparatus for touch signal. In the embodiment of the present disclosure, when scanning and reading a touch signal under interference, increasing the scanning frequency of the touch driving circuit to obtain more touch signal data corresponding to when the touch panel is under interference. Then comparing and sifting the touch signal data obtained from scanning. Removing the touch signal data that deviates a lot from the normal value and keeping the touch signal data within the normal range. Outputting the finally selected touch signal data to achieve the effects of improving the touch effect of the touch screen and improving the accuracy of touch screen reporting.

DESCRIPTION OF SPECIFIC EMBODIMENTS OF THE INVENTION

Specifically, the terminologies in the embodiments of the present disclosure are merely for describing the purpose of the certain embodiment, but not to limit the invention. Examples and the appended claims be implemented in the present disclosure requires the use of the singular form of the book "a", "an" and "the" are intended to include most forms unless the context clearly dictates otherwise. It should also be understood that the terminology used herein that "and/or" means and includes any or all possible combinations of one or more of the associated listed items.

Figure 1:
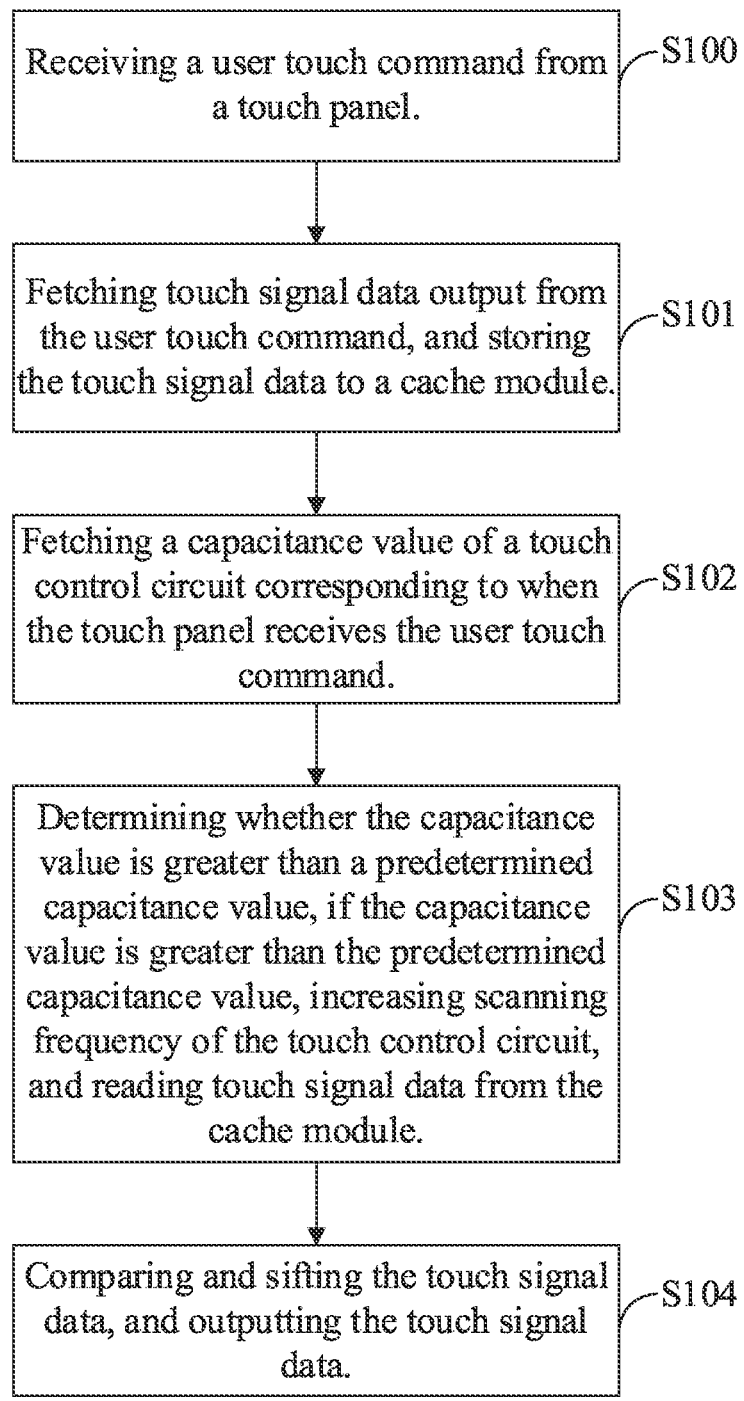
FIG. 1 is a flowchart of an anti-interference method for touch signal according to the embodiment of the present disclosure.

Please refer to FIG. 1, FIG. 1 is a structure diagram of traditional tri-gate design provided by the embodiment of the present disclosure. And please refer to FIGS. 2 and 3, FIG. 2 is a first structure diagram of a display device provided by the embodiment of the present disclosure, while FIG. 3 is a second structure diagram of a display device according to the embodiment of the present disclosure.

With the continuous expansion of the application range of touch screen display panels, people hope that when using various touch screens, the touch screen can quickly recognize various touch commands and make corresponding responses according to the applied touch commands. However, with the increase in the degree of integration of various electronic devices, when the touch screen is operated, the electric and magnetic fields generated by the integrated electronic devices will cause certain signal interference to the touch panel, and thus make the touch control of the touch panel fails or the received touch signal data has problems such as reporting errors, which affects the use of the device.

The embodiment of the present disclosure provides an anti-interference method and apparatus for touch signal to effectively solve the problem that the device is prone to report wrong points when the touch panel is under interference. Accordingly, the touch effect of the touch panel is effectively improved.

Figure 2:
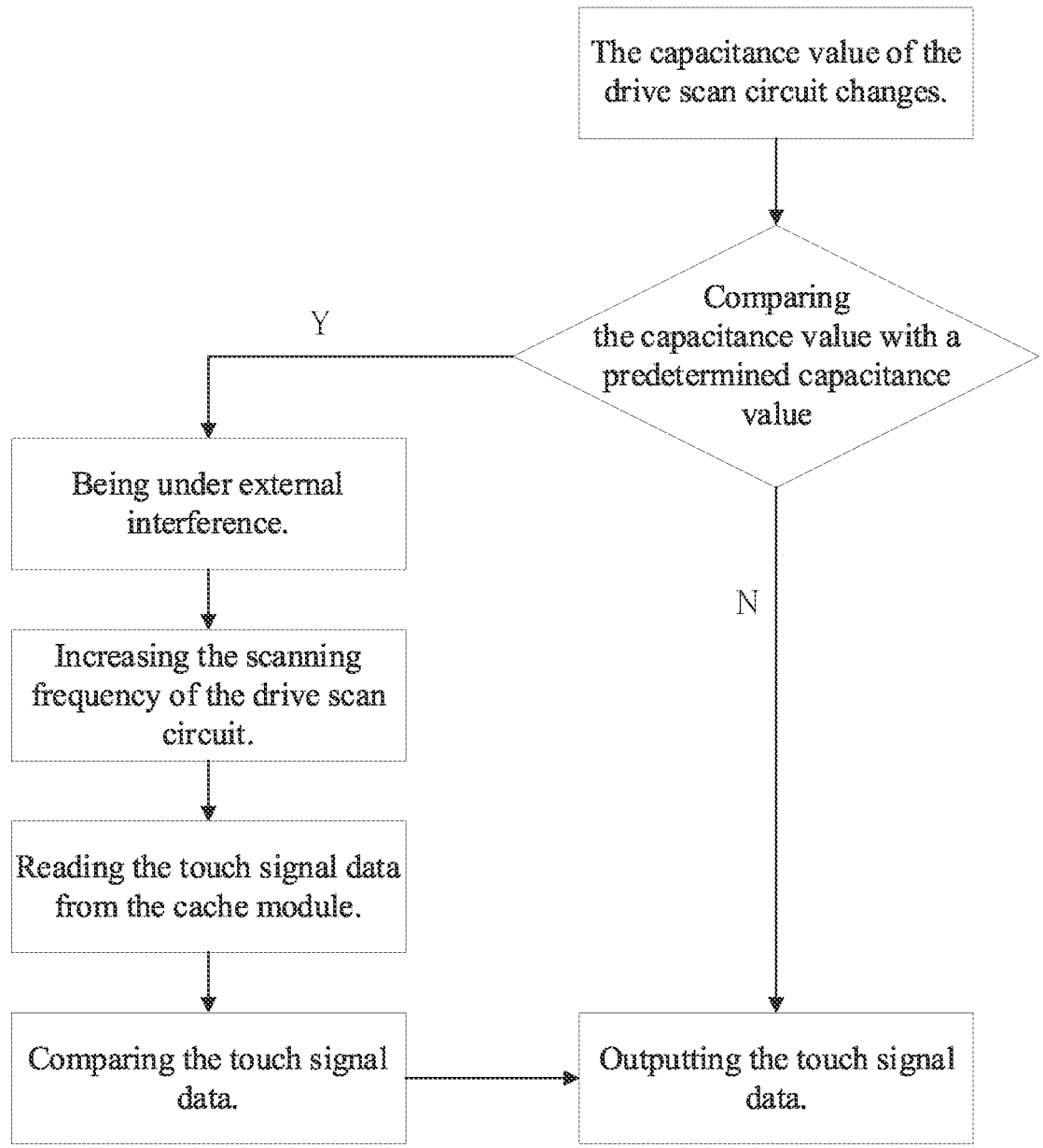
FIG. 2 is a flow chart of another anti-interference method for touch signal according to another embodiment of the present disclosure.
Figure 3:
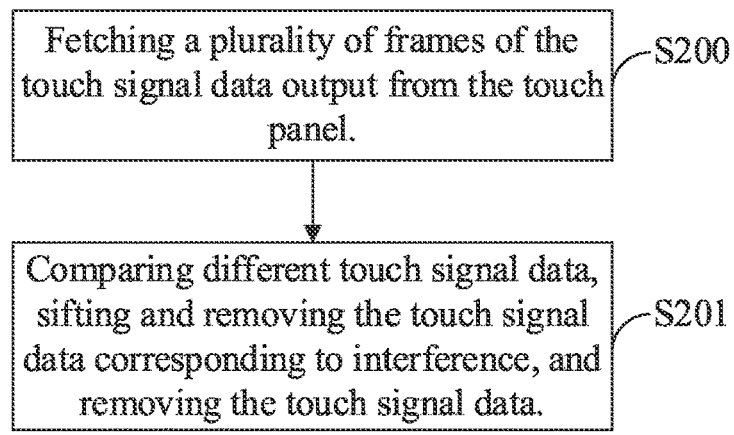
FIG. 3 is a sifting flow chart for touch signal according to the embodiment of the present disclosure.

As depicted in FIGS. 1 and 2, FIG. 1 is a flow chart of an anti-interference method for touch signal according to the embodiment of the present disclosure, and FIG. 2 is a diagram of another anti-interference method for touch signal according to the embodiment of the present disclosure. The anti-interference method for touch signal includes the following steps:

S100: receive a user touch command from a touch panel.

S101: fetch touch signal data output from the user touch command, and storing the touch signal data to a cache module.

S102: fetch a capacitance value of a touch control circuit corresponding to when the touch panel receives the user touch command.

S103: determine whether the capacitance value is greater than a predetermined capacitance value, if the capacitance value is greater than the predetermined capacitance value, increasing scanning frequency of the touch control circuit, and reading touch signal data from the cache module.

S104: compare and sift the touch signal data, and outputting the touch signal data.

In the embodiment of the present disclosure, take an in-vehicle touch display device as an example, the anti-interference process is not only for a touch signal but for touch display panels or touch systems in other fields. When the in-vehicle touch display is operating, it is often interfered by various complex situations from the outside world, such as strong electromagnetic, noise, violent shaking, and other factors.

First, applying a touch action to the touch display panel. In the embodiment of the present disclosure, the in-vehicle touch display panel includes a touch area and a non-touch area. When applying a user touch command to the touch display panel, the touch panel can be touched and controlled in the touch area.

Specifically, when applying the user touch command to the touch display panel, the user touch command can be point touch, that is, point-touching the touch panel. When point-touching the touch screen, its effective area on the screen is small.

At the same time, when applying the user touch command to the touch display panel, the user touch command can also be a sliding touch command. When the user touch command is a sliding touch command, its effective area on the touch screen is bigger than the effective area when point-touching.

When the touch panel receives the user touch command, generating touch signal data corresponding to the user touch command, and caching the generated touch signal data to the cache module of the touch panel for further processing of the touch signal data. Specifically, In the embodiment of the present disclosure, the user touch command signal can also include coordinate information, touch area information, and touch pressure information.

When applying the user touch command to the touch display panel, fetching a capacitance value of the touch control circuit when the touch panel receives the user touch command. For an embedded touch screen, because the screen is subject to external forces, the capacitance value of the touch control circuit inside the panel will change accordingly. The change of the capacitance value of the touch control circuit is not only related to the user touch command applied, but also related to the interference of the external environment. For example, external electromagnetic, sound waves, etc., will cause the capacitance in the touch control circuit to change accordingly, and this change will cause touch problems such as touch failure to a certain extent.

In the embodiment of the present disclosure, for a touch display panel, defining a predetermined capacitance value first. The predetermined capacitance value can be defined according to the various parameters of the touch drive circuit inside the touch panel product, or the average capacitance value directly calculated from the capacitance value of the touch drive circuit.

After the touch panel receives the user touch command, the capacitance value of the touch control circuit will change accordingly. If the touch is accompanied by external interference, the external interference will also change the capacitance value. Therefore, in the embodiment of the present disclosure, it is necessary to eliminate the touch signal data caused by the interference, so as to effectively ensure the accuracy of the transmitted touch signal data.

In the embodiment of the present disclosure, comparing the fetched capacitance value of the touch control circuit and the predetermined capacitance value. Specifically, if the fetched capacitance value of the touch control circuit is greater than the predetermined capacitance value, it means that the touch panel is under external interference. Therefore, the touch signal data corresponding to the user touch command cannot be input directly. At this moment, increasing the scanning frequency of the touch control circuit in the touch panel. When the scanning frequency is increased, the amount of touchpoints scanned in unit time is increased accordingly.

When the touch panel reads the touch signal data from the cache module, the method further includes the following steps:

dividing every scan time period of predetermined length interval into a storage period.

reading the touch signal data corresponding to a first storage period from the cache module when the capacitance value is less than or equal to the predetermined capacitance value.

reading the touch signal data corresponding to a second storage period from the cache module when the capacitance value is greater than the predetermined capacitance value.

The length of the touch signal data corresponding to the second storage period is longer than the length of the touch signal data corresponding to the first storage period.

Specifically, presuming that the scanning frequency of the touch drive circuit is M1 under normal circumstances. Storing the scanned data of every time interval t1 into the cache module. If the touch panel is not under interference, the corresponding capacitance value of the touch control circuit is less than or equal to the predetermined capacitance value. At this moment, reading the cached touch signal data information from the cache module directly, and converting the touch signal data into corresponding touch coordinate value and determining the specific touchpoint on the touch screen. This reduces the accuracy of the reported point of the touch panel, and effectively improves the touch accuracy and touch effect of the touch panel.

If the touch panel is under external interference, increasing the scanning frequency of the touch drive circuit. Determining this scanning frequency to be M2, and caching the scanned data of every time interval t1 into the cache module. When the touch signal is under scanning, the scanned data signal includes at least two frames of touch signal corresponding to non-interference condition. In the embodiment of the present disclosure, M2 is higher than M1, then in every time interval t1, the scanned data is increased. Caching the data information into the cache module. When the scanning frequency is M2, then in every same scan time interval, the length of the data cached in the cache module is longer than the length of the data cached in the cache module when the frequency is M1. Accordingly, the cached touch signal data is more.

In the embodiment of the present disclosure, reading the touch signal data from the cache module, and comparing and sifting the read touch signal data.

Furthermore, please refer to FIG. 3, FIG. 3 is a sifting diagram for the touch signal of the embodiment of the present disclosure. When sifting the touch signal data, the method includes the following steps:

S200: fetching a plurality of frames of the touch signal data output from the touch panel.

S201: comparing different touch signal data, sifting and removing the touch signal data corresponding to interference, and removing the touch signal data.

Fetching a plurality of frames of the touch signal data scanned by the touch panel from the cache module. Because in the cache module, the stored touch signal data includes both the touch signal data under interference and non-interference circumstances. Therefore, if the touch signal data with large errors is not filtered out, when the touch signal data is output, the position of the corresponding touchpoint and the position of the reported point will be deviated, which will affect the touch effect of the touch panel.

In the embodiment of the present disclosure, when comparing the read cached touch signal data, it can be compared according to the capacitance value corresponding to different touch signal data. If the capacitance value corresponding to the touch signal data is significantly different from the average capacitance value, it means that the touch signal data corresponding to the capacitance value is abnormal. Once these abnormal touch signal data are output, it will affect the accuracy of the reported point of the touch screen. At this moment, searching all the abnormal touch signal data, and removing the touch signal data. After the removing is finished, outputting the remaining normal touch signal data, and determining the touch position. Therefore, in the embodiment of the present disclosure, by increasing the scanning frequency under interference and removing the scanned abnormal touch signal data, the anti-interference effect of the touch panel is thereby effectively improved, and the touch performance of the display panel is improved.

Preferably, when comparing the touch signal data, counting and classifying all of the touch signal data to obtain a set of touch signal data. Determining location areas corresponding to each of the touch signal data according to the set. Finding a relatively dense and concentrated area of the touch signal data from the location areas. Defining the touch signal data in the dense area as normal data, and the touch signal data outside of this area is the noise touch data formed when under interference. Therefore, in the embodiment of the present disclosure, removing the corresponding reported point data outside the area, so as to effectively reduce the error of touch signal.

In the embodiment of the present disclosure, when the touch panel is under external interference, not only increasing the scanning frequency of the drive scan circuit, but comparing and sifting the scanned touch signal data, and removing the touch signal under interference. Thus, noise data is effectively reduced, the accuracy of the touch signal data, the anti-interference performance, and the touch effect of the touch panel are effectively improved.

Figure 4:
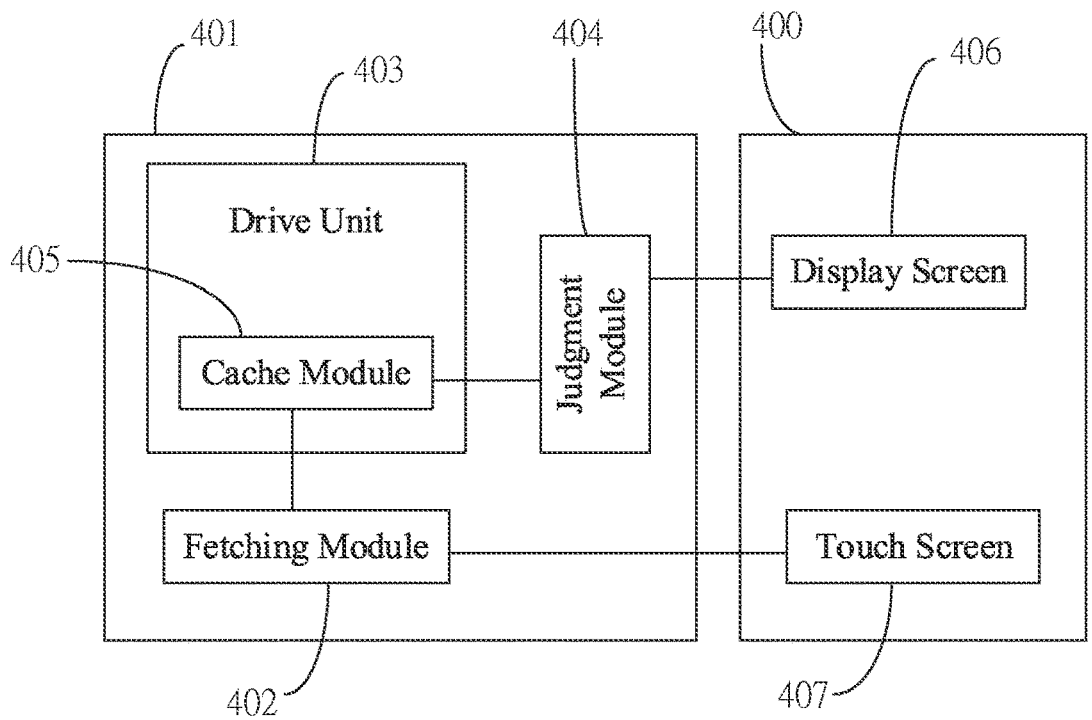
FIG. 4 is a diagram of an anti-interference apparatus for touch signal according to the embodiment of the present disclosure.

Furthermore, the embodiment of the present disclosure also provides an anti-interference apparatus. Please refer to FIG. 4, FIG. 4 is a diagram of an anti-interference apparatus for touch signal according to the embodiment of the present disclosure. The anti-interference apparatus includes a display unit 400 and a control unit 401. The display unit 400 is configured to realize functions such as display and touch operation, and the control unit 401 is configured to realize functions such as controlling the touch signal data.

Specifically, the display unit 400 further includes a display screen 406 and a touch screen 407. The touch screen 407 is configured to receive the user touch command. By applying various user touch commands on the touch screen 407, a series of reported point data is generated. The display screen 406 is configured to display the screen, which corresponds to the output module of the anti-interference apparatus.

In the control unit 401, the control unit 401 includes a drive unit 403. The drive unit 403 is the touch scan drive circuit inside the touch panel, configured to provide a scan drive signal for the touch panel. The control unit 401 also includes a fetching module 402. The fetching module 402 is configured to fetch the output touch signal data when applying the user touch command to the touch screen 407. The drive unit 403 scans the fetched touch signal data and caches the touch signal data into a cache module 405. At the same time, a judgment module 404 is configured to compare and determine the touch signal data in the cache module 405 and remove the touch signal data that is greatly affected by interference. Then transmitting the obtained normal touch signal data to the display screen to obtain a specific position of the touchpoint. Misjudgment of the reported point data of the touchpoint is prevented, thereby the touch accuracy and effect of the touch panel are effectively improved. Furthermore, the anti-interference apparatus provided by the embodiment of the present disclosure can also protect other functional elements, and synergize with every module provided by the embodiment of the present disclosure, so as to effectively improve every performance of the touch display panel.

Furthermore, please refer to Table 1, Table 1 shows the testing effect of a touch panel of the existing technology under interference. To be specific, respectively testing the signal data in CW modulation and AM modulation. In the experiment, processing large current impact interference experiment according to the general GMW3097 standard. Performing a five-point dot test on the copper pillar, and recording the under-reported points and false reported points of the touch. The detailed corresponding under-reported points and false reported points are shown in the table below.

TABLE 1

| CW modulation | under-reported points | 113 MHZ, 167 MHZ, 176 MHZ, 186 MHZ, 233 MHZ |
|---|---|---|
| | false reported points | 107 MHZ, 116 MHZ, 158 MHZ |
| AM modulation | under-reported points | 113 MHZ, 181 MHZ, 186 MHZ |
| | false reported points | none |

After the touch panel is optimized and calculated through the anti-interference method provided in the embodiment of the present disclosure, the false reported points are still tested according to the above test process, and there are no under-reported points or false reported points. Therefore, the anti-interference method provided in the embodiment of the present disclosure effectively improves the anti-interference performance of the touch panel and improves the touch effect of the touch panel.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. An anti-interference method for touch signal, comprising:
   receiving a user touch command of a touch panel;
   fetching touch signal data output from the user touch command, and storing the touch signal data to a cache module;
   fetching a capacitance value of a touch control circuit corresponding to when the touch panel receives the user touch command;
   determining whether the capacitance value is greater than a predetermined capacitance values;
   if the capacitance value is greater than the predetermined capacitance value, increasing scanning frequency of the touch control circuit;
   dividing every scan time period of predetermined length interval into a storage period;
   reading a touch signal data corresponding to a first storage period from the cache module when the capacitance value is less than or equal to the predetermined capacitance value; and
   reading the touch signal data corresponding to a second storage period from the cache module when the capacitance value is greater than the predetermined capacitance value, wherein the length of the touch signal data corresponding to the second storage period is longer than the length of the touch signal data corresponding to the first storage period; and
   comparing and sifting the touch signal data, wherein when comparing the touch signal data, counting and classifying all of the touch signal data to obtain a set of touch signal data, determining location areas corresponding to each of the touch signal data according to the set, finding a dense area of the touch signal data from the location areas, defining the touch signal data in the dense area as normal data, and outputting the touch signal data.

2. The anti-interference method for touch signal of claim 1, wherein when the capacitance value is less than or equal to the predetermined capacitance value, reading the touch signal data from the cache module directly, and outputting the touch signal data.

3. The anti-interference method for touch signal of claim 1, wherein the length of the second storage period comprises at least two frames of touch signal data corresponding to non-interference condition.

4. The anti-interference method for touch signal of claim 1, wherein when the touch panel receives the user touch command, the user touch command comprises touch button command and sliding touch command.

5. The anti-interference method for touch signal of claim 1, when sifting the touch signal data, further comprising:
   fetching a plurality of frames of the touch signal data output from the touch panel; and
   comparing different touch signal data, sifting and removing the touch signal data corresponding to interference, and removing the touch signal data.

6. The anti-interference method for touch signal of claim 5, wherein when comparing the touch signal data, removing the touch signal data corresponding to the capacitance value greater than the predetermined capacitance value.

7. The anti-interference method for touch signal of claim 1, wherein the touch signal data comprises coordinate information, touch area information, and touch pressure information of touchpoint corresponding to the user touch command.

8. An anti-interference method for touch signal, comprising:
   receiving a user touch command of a touch panel;
   fetching touch signal data output from the user touch command, and storing the touch signal data to a cache module;
   fetching a capacitance value of a touch control circuit corresponding to when the touch panel receives the user touch command;
   determining whether the capacitance value is greater than a predetermined capacitance value;
   if the capacitance value is greater than the predetermined capacitance value, increasing scanning frequency of the touch control circuit;
   dividing every scan time period of predetermined length interval into a storage period;
   reading a touch signal data corresponding to a first storage period from the cache module when the capacitance value is less than or equal to the predetermined capacitance value; and
   reading the touch signal data corresponding to a second storage period from the cache module when the capacitance value is greater than the predetermined capacitance value, wherein the length of the touch signal data corresponding to the second storage period is longer than the length of the touch signal data corresponding to the first storage period; and
   comparing and sifting the touch signal data, and outputting the touch signal data.

9. The anti-interference method for touch signal of claim 8, wherein when the capacitance value is less than or equal to the predetermined capacitance value, reading the touch signal data from the cache module directly, and outputting the touch signal data.

10. The anti-interference method for touch signal of claim 8, wherein the length of the second storage period comprises at least two frames of touch signal data corresponding to non-interference condition.

11. The anti-interference method for touch signal of claim 8, wherein when the touch panel receives the user touch command, the user touch command comprises touch button command and sliding touch command.

12. The anti-interference method for touch signal of claim 8, when sifting the touch signal data, further comprising:
fetching a plurality of frames of the touch signal data output from the touch panel; and
comparing different touch signal data, sifting and removing the touch signal data corresponding to interference, and removing the touch signal data.

13. The anti-interference method for touch signal of claim 12, wherein when comparing the touch signal data, removing the touch signal data corresponding to the capacitance value greater than the predetermined capacitance value.

14. The anti-interference method for touch signal of claim 8, wherein the touch signal data comprises coordinate information, touch area information, and touch pressure information of touchpoint corresponding to the user touch command.

* * * * *